United States Patent [19]
Crowder

[11] 3,877,408
[45] Apr. 15, 1975

[54] AQUATIC VEHICLES

[76] Inventor: Wyly Kenneth Crowder, 3255 Windcroft Dr., Pontiac, Mich. 48054

[22] Filed: June 28, 1971

[21] Appl. No.: 157,341

[52] U.S. Cl.............. 114/67 A; 180/117; 180/129
[51] Int. Cl........................... B63b 1/34; B60v 1/02
[58] Field of Search......... 114/67 R, 67 A; 115/1 R, 115/11, 12 R, 12 A; 180/7, 116, 117, 122, 127, 129, 130

[56] References Cited
UNITED STATES PATENTS

| | | | |
|---|---|---|---|
| 1,716,400 | 6/1929 | Weis | 115/11 |
| 3,162,260 | 12/1964 | Cockerell | 180/129 |
| 3,174,569 | 3/1965 | Eggington | 114/67 A |
| 3,189,114 | 6/1965 | Eggington | 114/67 A |
| 3,207,113 | 9/1965 | Tattersall | 114/67 A |
| 3,213,956 | 10/1965 | Cockerell | 180/7 |
| 3,249,165 | 5/1966 | Chaplin | 180/122 |
| 3,621,932 | 11/1971 | Tattersall et al. | 180/126 |
| 3,624,737 | 11/1971 | Keller | 115/12 R |

FOREIGN PATENTS OR APPLICATIONS

| | | | |
|---|---|---|---|
| 718,765 | 9/1965 | Canada | 180/129 |
| 1,903,620 | 9/1969 | Germany | 180/127 |
| 1,103,962 | 2/1968 | United Kingdom | 180/127 |

OTHER PUBLICATIONS

"Hughes Hydroskimmer," Space/Aeronautics Magazine, Vol. 34, No. 2, August, 1960, pg. 32.

*Primary Examiner*—Trygve M. Blix
*Assistant Examiner*—Barry L. Kelmachter
*Attorney, Agent, or Firm*—James T. Barr

[57] ABSTRACT

An air cushion aquatic vehicle using an air pump to generate air pressure along and beneath the vehicle to provide lift and forward thrust. A flat water curtain formed by a water pump at the stern of the vehicle effects a seal for the air pressure as well as promoting forward thrust in addition to the air means. In addition a bow skirt or curtain of water or lesser extent is created at the bow of the vehicle for comprising a seal, thus compensating for rough water conditions.

5 Claims, 9 Drawing Figures

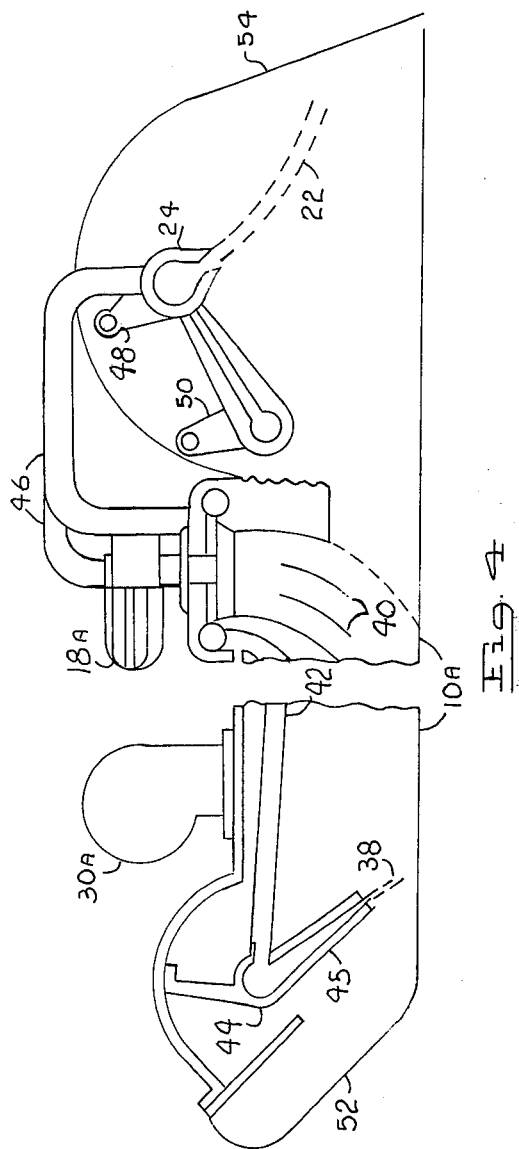

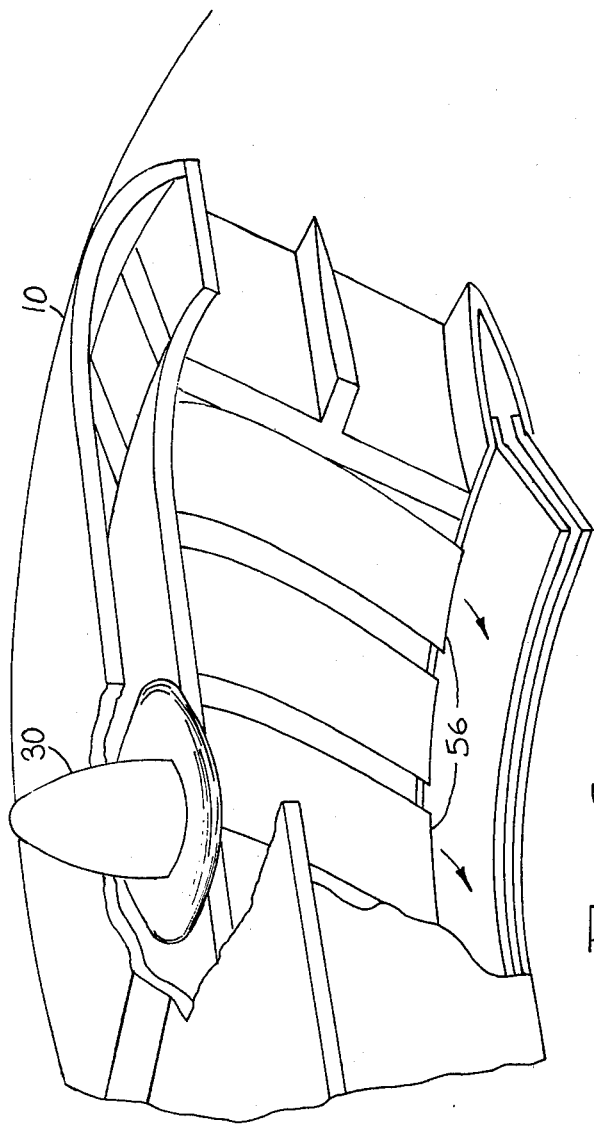

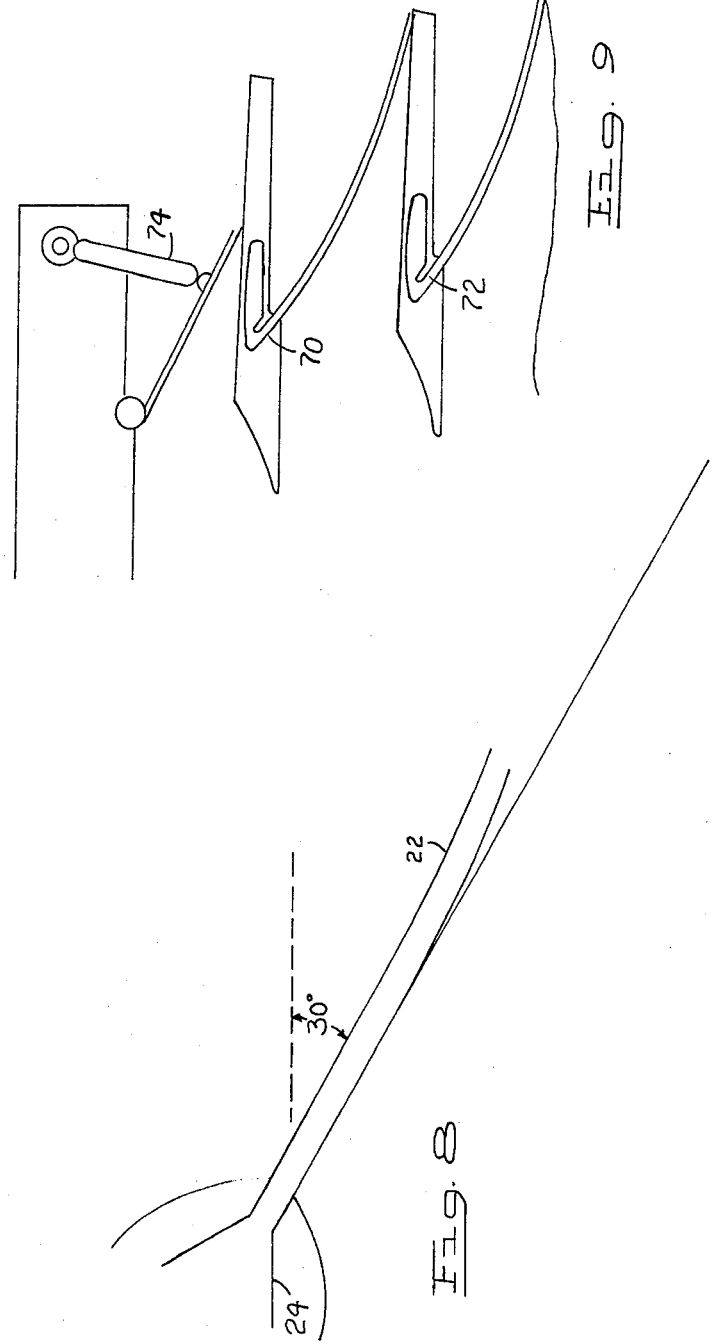

3,877,408

AQUATIC VEHICLES

GENERAL DESCRIPTION

The conventional air cushion or hydro-lift boats, generally referred to as hovercrafts, have been limited in results because of the necessity for high initial power to obtain the lift and create the air blanket which sustains the boat above the water. In addition, rough or turbulent water has deterred the successful attainment of the lift effect resulting in a further waste of power. Other aquatic vehicles have utilized water jets as propulsion means but relatively unsuccessful in their utilization of power.

The present invention solves the problems of aquatic vehicles in effecting maximum usage of power with the attainment of high efficiency, safety and performance. This is accomplished by the use of both pneumatic and hydraulic means in a manner to be explained hereinafter.

The versatility of this invention can best be understood when it is realized that air cushion vehicles can traverse shallow water as well as the deepest and most turbulent ocean waves. It is, therefore, a primary object of this invention to provide an aquatic vehicle which utilizes the thrust and lift features of an pneumatic drive means as well as an hydro power means for containing the air pressure with providing additional thrust to the vehicle, both means accomplishing smooth, economical and high speed travel, while traversing water under most aquatic conditions.

Another object of the invention is to provide an aquatic vehicle which not only minimizes the turbulence factors in the water environment but aids in promoting the marine ecology. Other watercraft which use propellers, jets and high wake generating means create water troubles which muddy or otherwise disturb marine life. In the present invention the water blankets created for containing the air-lift effect and additional thrust further picks up air and introduces it into the water to thereby aerate that part of the water over which the vehicle passes, while not disturbing the subsurface or plant life therein.

In conventional hovercraft a stern skirt of solid material is used to contain the air cushion beneath the craft. It can be realized that this skirt when dragged over the water when the craft is in motion, creates a great deal of friction and resistance to forward travel. In the present invention this solid skirt is eliminated and the stern of the vehicle is sealed by a wall of water which prevents drag and bouncing, thus promoting forward travel without the attendant resistance to the vehicle from the body of water over which it is travelling.

It is another object of this invention to provide an aquatic vehicle which eliminates propellers and other dangerous objects which project beneath the surface of the water and which may harm swimmers, as well as eliminating the factors which cause pollution, by the use of water and air power that is smooth, quiet and efficient.

These and other objects will be more particularly described in the following description, claims and drawings, in which:

DRAWINGS

FIG. 4 is a side plan view, partly shortened, showing the essential air and water generating features of the invention.

FIG. 6 is a perspective view of the prow of the vehicle showing means for alleviating the shock of high waves or turbulent water.

FIG. 8 shows a diagramatic view of the relationship between the water wall with respect to a diagonal line of the vehicle.

FIG. 9 is a fragmentary side view of a modified form of the invention utilizing pairs of water walls or curtains.

DETAILED DESCRIPTION

Figure 1:
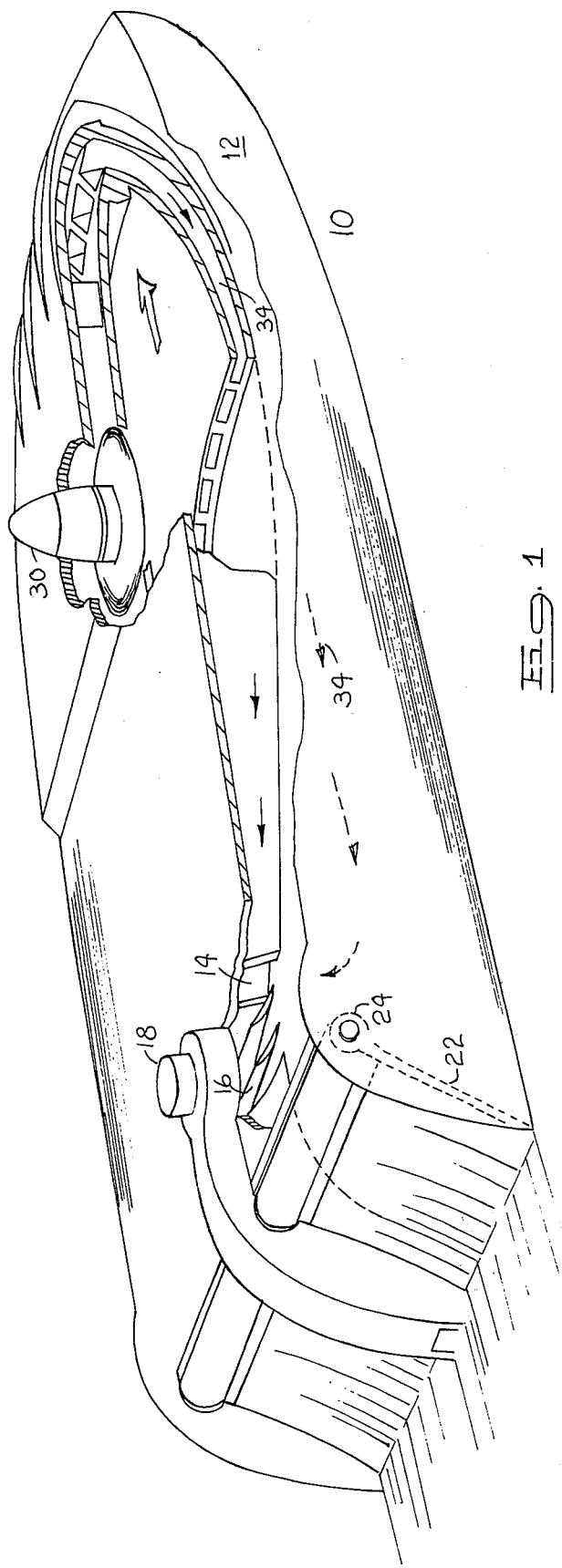
FIG. 1 is a perspective view of an aquatic vehicle embodying the principles of the invention. Parts of this view have been broken away to show inner details.

Referring now to FIG. 1, an aquatic vehicle 10 is shown in motion travelling over a body of water (generally indicated at the stern thereof). The bow 12 contains water inlet ports 14, within the centerboard, which directs water longitudinally of the vehicle 10 to the vanes 16 of a water pump 18. This action is caused by the movement of the vehicle 10 which tends to scoop up the water while moving. The water intake may be accomplished in several ways without departing from the concept of this invention. In FIG. 1 the inlet ports are located in the center board as indicated by the upper arrows and scoop the water near the bow 12. In FIG. 4 the water scoops 40 are located near the midsection to avoid bow lifting and resultant loss of water intake. The optimum position of the water intake will depend upon many factors, such as the size of the boat or ship, turbulence of the water and location of the body of water, for example, the Everglades as opposed to the North Atlantic Ocean.

Figure 2:
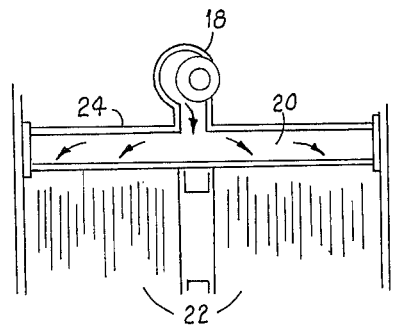
FIG. 2 is a sectional schematic-like view looking down on the vehicle of FIG. 1 and illustrating the water wall generator.

As shown in FIG. 2, the water pump 18 pumps the incoming water along a channel 20 and thru spray jets to form a water curtain 22 or flat wall-like pattern of water at the stern of the vehicle 10. The channel 20 and the jets are enclosed within a rotatable tube 24 adjustable to change the angle of the water wall 22 relative to the longitudinal line of the vehicle 10 for obtaining maximum efficiency under different aquatic conditions.

Figure 3:
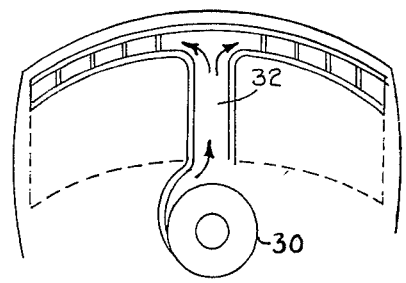
FIG. 3 is a sectional schematic-type view looking down on the vehicle of FIG. 1 and illustrating the air generating means.

In FIGS. 1 and 3, there is shown an air pump 30 for creating an air cushion and thrust beneath the vehicle 10, which is contained by the bow skirt or water curtain and the stern water wall 22. The air pump 30 supplies forced air thru suitable ducts 32 from the bow position longitudinally to the stern area of the vehicle 10 as indicated by the arrows 34. Both air pump 30 and water pump 18 may be powered electrically or belt-driven by means of a centrally located internal combustion engine (not shown). The power means being utilized to drive the pumps, both air and water, is relatively immaterial to the utilization of this invention.

Figure 5:
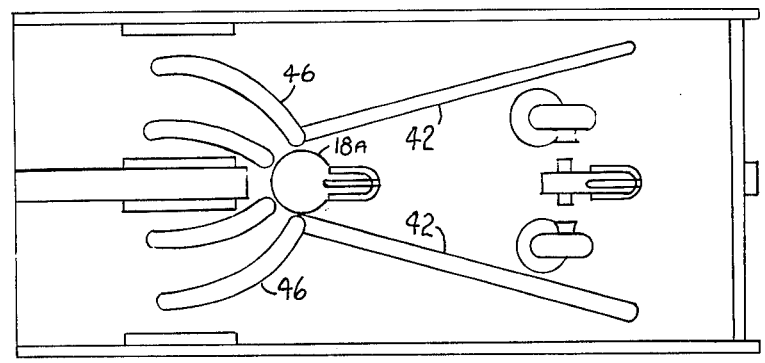
FIG. 5 is a fragmentary top view of the water generating portion of the vehicle.

In FIG. 4, a slightly modified form of this invention is shown in outline and looking at the vehicle 10A from a side view. In this view, an abbreviated water wall 38 at the bow is formed by means similar to the stern water wall 22 generating means. A water pump 18A, having inlet scoops 40 located in the centerboard of a trimaran, for example, pumps the water thru flexible conduits 42 to the bow channel 44 and also thru conduits 46 to the stern channel 24. The water intake is accomplished in either or both of the following ways. The forward motion of the vehicle creates a scooping action and the water pump 18 or 18A has a sucking action as in a water well pump. This flexible conduit arrangement is also shown in FIG. 5, however in the reverse position. The bow channel 44 is integrally formed with a bow skirt 45, which are adjustable relative to the vehicle 10A to provide optimum positioning for the water wall 38 depending upon the conditions and the particular configuration of the aquatic vehicle being used. Similarly, the stern channel 24 and water wall 22 are adjustable by means of tilting arm 48 and elevating arm 50 to vary both the height and the angularity of the water wall 22 with respect to the vehicle 10A and the surface of the water. Note, that the outline lines 52 and 54 of the vehicle 10A are merely illustrative of a boat-like configuration at the sides thereof which would not be present at the intermediate portion of the boat, the water walls 38 and 22 constituting the closures for the bow and stern to contain the air supplied by the air pump 30A.

In FIG. 6, a modified form of water intake is shown to reduce shock to the vehicle 10 caused by rough waves and turbulent conditions. Instead of the bow skirt and water wall 38 of FIG. 4, flexible flaps 56, having a resilient memory feature in the closed position are provided. The flaps 56, under normal or quiescent conditions remain closed against the bow of the vehicle 10. Upon the appearance and resultant shock caused by high waves or turbulent water, the flaps 56 resiliently absorb the shock by bending inwardly (as shown) to permit the boat to ride into the high waves or turbulent water without being buffeted thereby. To avoid swamping of the boat, however, this excess water is immediately directed downwardly away from the boat to add some lift to the bow portion.

Figure 7:
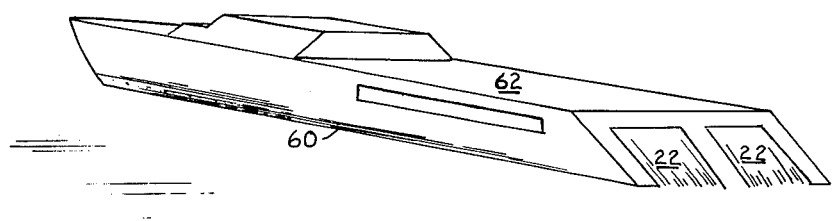
FIG. 7 is a perspective view of an ocean-going version of the invention.

In FIG. 7, an ocean-going version 60 of the vehicle 10 is illustrated. The water wall 22 performs the same function as in the embodiment of FIG. 1 and also adjustable both vertically and angularly with respect to the boat 60. Steering may also be effected by varying the water pressure provided by the water pump or by deflecting the water wall 22. A helicopter or airplane landing deck 62 is provided as an optional feature. In addition, the power plant for the air and water generators may be atomic or conventional means.

In FIG. 8, there is illustrated an optimum angularity relationship which has been tested to promote efficiency between the water wall 22 and the longitudinal line of the vehicle or the surface of the water. The optimum angle in limited tests is approximated as 30° but the range can be between 20° and 35° depending upon the configuration of the aquatic vehicle to a certain extent. It has also been found that the 30° optimum range in addition to containing the air pressure beneath the vehicle, promotes forward thrust by water jet action which adds to the thrust created by the air cushion pressure, thus aiding forward motion of the vehicle. However, it should be noted that the primary purpose of the water wall 22 is to contain the air beneath the vehicle 10, retard friction, and thus under some conditions the angularity of the water wall 22 will not be critical or limited to the range between 20° and 35°, but may be as high as the 90° maximum. Some calculations that illustrate but are not limiting, the angularity relationship are as follows:

Assuming that the vehicle is travelling at 100 feet per second, and the water wall 22 is travelling at 115 feet per second, and the optimum angularity of 30° between the water wall and the longitudinal line of the vehicle is set, then;

```
Mass of water/second = 8000 pound (80 feet wide)
Horsepower required to accelerate from 100 to 115 fps=       7100
To lift water ten feet = 1460 hp                             1460
Work done (thrust) 43 × 10 × 80 × 100 divided by 550=        6200
                                                  Surplus    2360
            Using two nozzles, 60 inch vertical pitch;
Mass of water/second= 2000 pound (80 feet wide) × 2=         4000
Horsepower required to accelerate from 100 to 115 fps=       3550
To lift water 90 inches= 548 hp                              1460
                                                             5010 hp
Work done is still =                                         6200
                                                 Net loss    1190
```

In the event that it is required or desireable for purposes of compartment containment (large ships) or to promote efficiency for any reason, it is contemplated that the water walls 22 or curtains may be arranged in tandem, triplicate or multiples thereof, either horizontally or vertically. For example, in FIG. 9, a tandem arrangement is shown whereby an upper nozzle 70 and a lower nozzle 72 may be used. An adjusting arm 74, linked to both nozzles 70 and 72 can vary the angularity of the water walls to accomodate unique conditions or to promote efficiency. This tandem arrangement is secured to the stern of the aquatic vehicle with the lower nozzle 72 directed toward the surface of the water, while the upper nozzle 70 is directed outwardly to form a second water curtain as well as providing forward thrust.

Therefore, it is evident that this invention provides a new and unique concept with respect to aquatic travel and vehicles which is not limited to the depth of water, while promoting efficiency and safe travel, and it is intended only to be limited by the scope of the appended claims.

What is claimed is:

1. An air cushion aquatic vehicle comprising:

power means for driving said vehicle including air pressure means applying air flow at the bow and thru an air scoop longitudinally of said vehicle, side and bow skirts on said vehicle for containing air beneath said vehicle, water pump means for forming a flat wall of water at the stern of said vehicle and sealing said air beneath said vehicle, and conduit means in said vehicle for directing water to said water pump means and separate from said air scoop, whereby forward thrust and lift is provided to said vehicle.

2. An air cushion aquatic vehicle according to claim 1 wherein said bow skirt includes means for forming a bow water wall relatively smaller than said stern water wall.

3. An air cushion aquatic vehicle according to claim 1 wherein said conduit means for directing water to said water pump means includes an enclosed center board with water scoops located near the mid-section of said vehicle.

4. An air cushion aquatic vehicle according to claim 1 wherein said water pump means includes adjustable nozzle means for varying the angularity of said flat wall of water with respect to said vehicle.

5. An air cushion aquatic vehicle according to claim 4 wherein said adjustable nozzle means includes adjustable arms to vary the angularity of some of said nozzle means to effect steering of said vehicle.

* * * * *